United States Patent [19]

Drocco

[11] 4,436,432
[45] Mar. 13, 1984

[54] KNEADING MACHINE

[75] Inventor: Amabile Drocco, Alba, Italy

[73] Assignee: Sancassiano S.p.A., Cuneo, Italy

[21] Appl. No.: 321,049

[22] Filed: Nov. 13, 1981

[30] Foreign Application Priority Data

Nov. 13, 1980 [IT] Italy .................................. 68740 A/80

[51] Int. Cl.³ .......................... A21C 1/06; A21C 1/14; B28C 1/16; B29B 1/06
[52] U.S. Cl. ........................................ 366/95; 99/348; 366/56; 366/92; 366/185; 366/200; 366/213; 366/224; 366/293; 366/302
[58] Field of Search ................ 366/54, 56, 77, 92-95, 366/100, 185, 187, 194, 197, 199, 200, 208, 213, 219, 222, 224, 261, 302, 303, 318, 320, 330, 349, 293; 99/348

[56] References Cited

U.S. PATENT DOCUMENTS

| 200,183 | 2/1878 | Durand | 366/94 |
| 562,952 | 6/1896 | Durand | 366/94 |
| 3,749,373 | 7/1973 | Kemper | 366/92 |
| 3,951,387 | 4/1976 | Warden et al. | 366/302 X |
| 4,166,705 | 9/1979 | Fronske | 366/224 X |

FOREIGN PATENT DOCUMENTS 371047 2/1907 France .................................. 366/94

Primary Examiner—Timothy F. Simone
Attorney, Agent, or Firm—Birch, Stewart, Kolasch & Birch

[57] ABSTRACT

In a kneading machine including a fixed support structure, a kneading trough supported centrally for rotation about a vertical axis by the fixed support structure, and a rotary kneading tool located within the kneading trough, the kneading tool is rotatable about a substantially horizontal axis. The machine is also provided with fixed counter-members which cooperate with the kneading tool.

6 Claims, 4 Drawing Figures

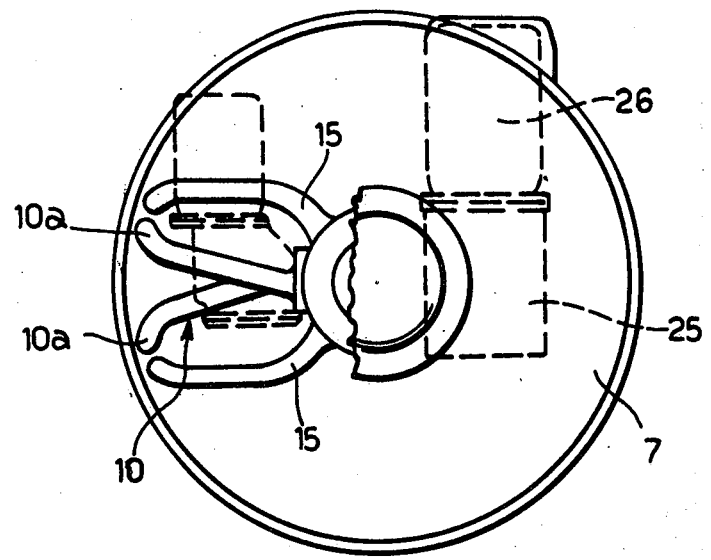
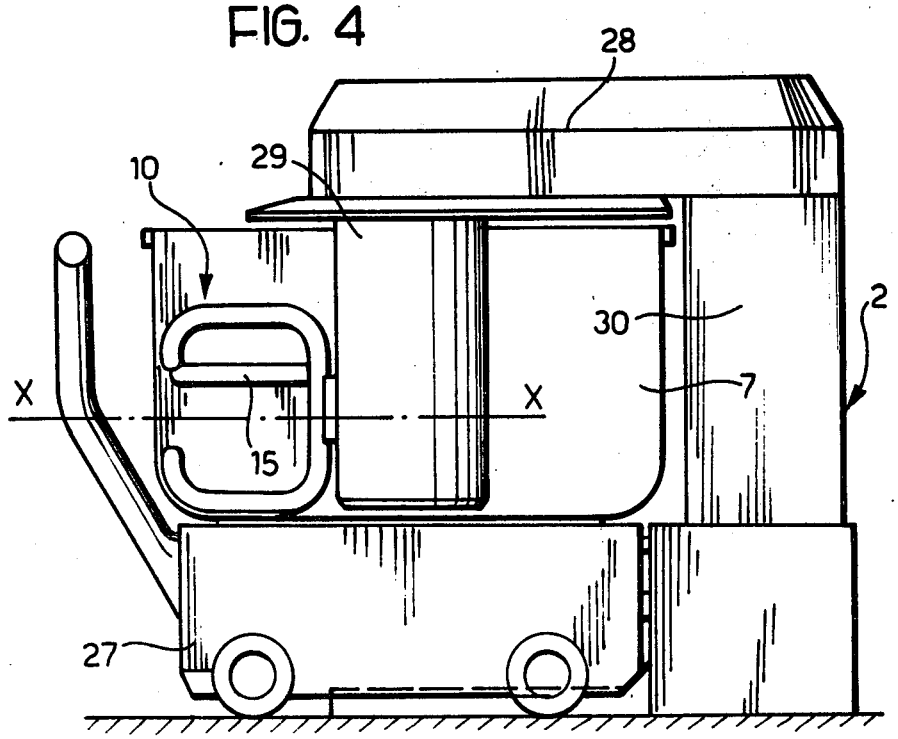

KNEADING MACHINE

The present invention relates to a kneading machine, particularly for flour doughs, of the type including:
 a fixed support structure;
 a kneading trough supported centrally by the fixed support structure for rotation about a vertical axis, and
 a rotary kneading tool located within the kneading trough.

In known machines of the type specified above, the kneading tool is supported for rotation about a substantially vertical axis by a part of the fixed structure of the machine located at the side of the kneading trough. This makes these machines rather bulky. Furthermore, the kneading tool is usually supported by a cantilever arm projecting from the structure of the machine above the kneading trough. This prevents access to the kneading trough from the part in which the arm is located.

A further disadvantage of the machines using a kneading tool with a substantially vertical axis lies in the fact that, during operation, the temperature of the kneading tool sometimes causes changes in the dough itself.

The object of the present invention is to avoid the above-mentioned disadvantages which are present in known machines.

In a kneading machine according to the invention, this object is achieved by the fact that the kneading tool is rotatable about a substantially horizontal axis, and that the machine is further provided with fixed counter-members which cooperate with the kneading tool.

According to a further characteristic, the axis of rotation of the kneading tool extends radially with respect to the vertical axis of rotation of the kneading trough.

In a preferred embodiment of the machine according to the present invention, the kneading trough is supported for rotation on a vertical hollow central shaft forming part of the fixed support structure of the machine, and the kneading tool is supported by the central shaft for rotation about said substantially horizontal axis. The mechanical drive for rotating the kneading tool is also housed within the central shaft.

Owing to the characteristics described above, the size of the kneading machine according to the preferred embodiment of the invention, when seen in plan, corresponds substantially to the size of the kneading trough. Indeed, this machine does not require a structure at the side of the kneading trough to support the kneading tool, as in known machines.

Furthermore, trials conducted by the Applicants have shown that, in general, the use of a kneading tool with a horizontal axis of rotation results in a smaller increase in the temperature of the dough during operation of the machine, which reduces the risks of changes in the dough itself, as well as a reduction in the time necessary for carrying out the kneading.

Further characteristics and advantages of the present invention will become clear from the description which follows with reference to the appended drawings, provided purely by way of non-limiting example, in which:

FIG. 3 is a plan view of the machine of FIG. 1, and

FIG. 4 illustrates a second embodiment of the kneading machine according to the invention.

Figure 1:
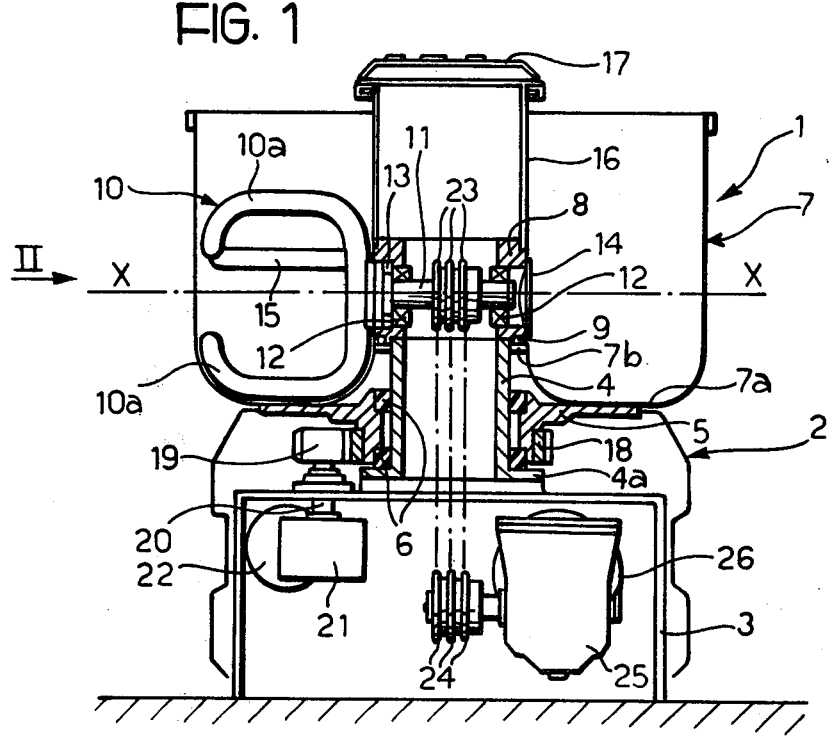
FIG. 1 is a schematic, partially-sectioned side elevational view of a kneading machine according to the present invention.

In the drawings, a kneading machine, generally indicated 1, includes a fixed support structure 2 with a hollow base 3.

An annular end flange 4a of a hollow central shaft 4, which is arranged with its axis vertical, is fixed above the base 3 by a number of screws (not shown in the drawings).

An annular support 5 is rotatably supported about the shaft 4 by bearings 6 of a synthetic material with a low coefficient of friction.

The bottom 7a of a kneading trough 7, intended to receive the product to be kneaded, is fixed to the upper surface of the annular support 5.

At the upper end of the hollow central shaft 4 there is fixed, by means of screws (not illustrated in the drawings), a tubular element 8 which is coaxial with the shaft 4 and is provided at its lower end with a seal 9 of synthetic material suitable for preventing the infiltration of water and powder, against which slides the inner edge 7b of the bottom 7a of the kneading trough 7.

Within the trough 7, a kneading tool 10 is fixed to a horizontal spindle 11 which is disposed radially with respect to the axis of rotation of the kneading tank, and is supported rotatably by the tubular element 8 with rolling bearings 12.

The spindle 11 is provided with an annular seal 13 at its end facing the kneading tool 10 and with a cover 14 at its opposite end. The rolling bearings 12 are also sealed.

The kneading tool 10 is constituted by a fork having two free end portions 10a which lie in planes staggered relative to each other so as to define a substantially helical spiral (see FIG. 3) having a horizontal axis perpendicular to the axis of rotation X—X of the kneading tool 10.

Located at both sides of the tool 10 are two fixed counter-arms 15 which cooperate with the kneading tool 10 during operation of the machine.

A further tubular element 16 is fixed above the tubular element 8, and has a control panel 17 at its upper end for carrying the controls of the machine.

The annular support 5 is provided with a ring gear 18 which meshes with a pinion 19 mounted, by means of a self-aligning bearing (not shown), on a shaft 20 which is connected by a worm reduction unit 21 to an electric motor 22 for rotating the kneading trough 7.

The spindle 11 of the kneading tool 10, on the other hand, is provided with three gear wheels 23 which are connected, by the same number of chains, to three gear wheels 24 mounted on the output shaft of a worm reduction unit 25 which is driven by an electric motor 26 for rotating the kneading tool 10. The structure of the reduction unit 25 is articulated to the fixed structure 2 about a horizontal axis 27 (see FIG. 2) to allow the tension of the drive chains to be adjusted.

During operation of the machine, the motor 22 rotates the trough 7 through the reduction unit 21, the toothed pinion 19, the ring gear 18 and the annular support 5. During the rotation of the kneading trough, the axis of rotation X—X of the kneading tool remains in a fixed position. The electric motor 26 rotates the tool 10 about the axis X—X through the reduction unit 25 and the drive chains. Due to the rotation of the kneading tool 10, the dough is compressed between the tool and the bottom 7a of the kneading trough 7, and between the tool and the fixed counter-arms 15. The latter also serve to separate from the tool the dough entrained by the kneading tool during rotation.

In a similar manner to known machines, the kneading tool 10 may rotate at a first lower speed during the stage of mixing the ingredients of the dough, and at a second higher speed during the subsequent kneading stage.

Figure 2:
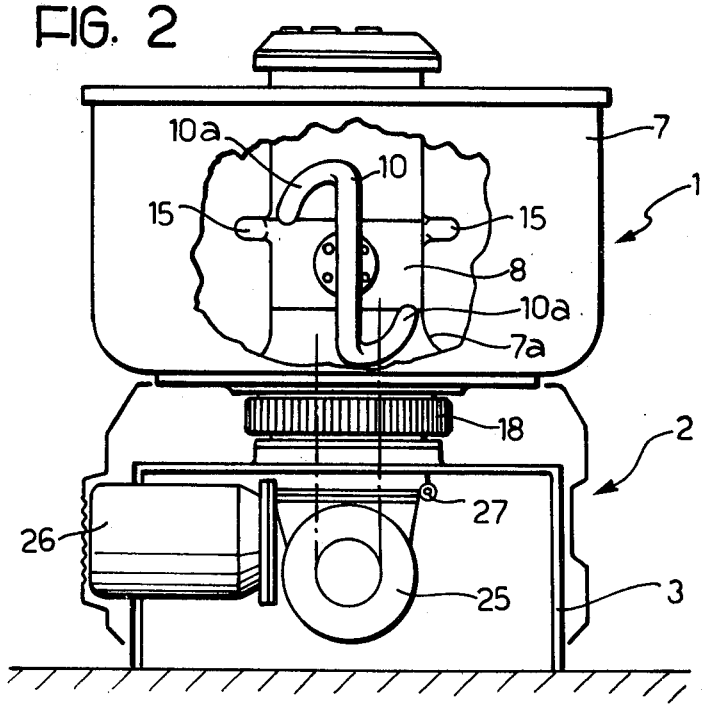
FIG. 2 is a side view in the direction of arrow II of FIG. 1.

Trials conducted by the Applicants have shown that the use of a machine of the type illustrated in FIGS. 1 to 3 allows the time necessary for the mixing stage to be reduced from 2 to 3 minutes (the time necessary with known machines) to 1 to 1.5 minutes. Furthermore, the total time for kneading is about 4.5 to 5.5 minutes as against 7 to 8 minutes which is typical of known machines.

The trials have also shown that the use of a machine of the type described above allows the temperature increase in the dough, which occurs during the operation of known machines, to be reduced substantially (by about 40%).

From the foregoing description, it is also clear that the embodiment described has particular advantages in being of smaller size than the known machines. Indeed, the size of the machine illustrated in FIGS. 1 to 3, when seen in plan, corresponds substantially to the size of the kneading trough 7.

Naturally, it is possible for the entire structure illustrated in FIGS. 1 to 3 to be mounted, in a known manner, on support means arranged to allow overturning of the machine structure, particularly the kneading trough 7, for discharge of the dough at the end of a cycle.

FIG. 3 illustrates a second embodiment of the machine according to the invention, in which the kneading trough 7 is supported, in a known manner, by a carriage 27 which is releasably coupled to the fixed support structure 2 of the machine. In this case, the structure 2 includes a cantilever arm 28 which projects over the kneading trough 7. A hollow shaft 29, which projects below the arm 28 and is disposed centrally and axially within the trough 7, supports a kneading tool 10 (which is of the same type as that shown in FIGS. 1 to 3) for rotation about a horizontal axis X—X, and the fixed counter-arms 15. The motors for rotating the trough 7 and the tool 10 are disposed within the fixed support structure 2, while the mechanical transmissions connecting these motors to respective driven members are housed within the hollow shaft 29 and the carriage 27. The structure of the carriage and the means for connecting the carriage to the fixed structure of the machine are known in themselves and do not fall within the scope of the present invention.

The upright 30, which forms part of the fixed support structure 2, is disposed at the side of the trough 7 and, furthermore, is telescopic so as to allow the raising of the cantilever arm 28. Thus, it is possible to withdraw the shaft 29 of the kneading tool 10 from the trough 7, before separating the carriage 27 from the structure 2 to remove it from the machine. The structure of the upright 30 is also known in itself.

Naturally, while the principle of the invention remains the same, the details of construction and forms of embodiment may be varied widely from that described and illustrated purely by way of example, without departing from the scope of the present invention.

I claim:

1. A kneading machine including:
    a fixed support structure;
    a kneading trough centrally supported by said support structure for rotation about a vertical axis, and
    a rotary kneading tool located within said kneading trough,
    wherein the improvement comprises providing:
    said kneading tool with means for rotating said tool about a substantially horizontal axis, and
    said machine being further provided with fixed counter-members which comprise two arms supported in a substantially horizontal plane by a central shaft and disposed at both sides of said kneading tool, said fixed counter-members cooperating with said kneading tool to separate the dough entrained by said tool during rotation, wherein the axis of rotation of said kneading tool extends substantially radially of the vertical axis of rotation of said kneading trough.

2. The kneading machine as defined in claim 1, wherein said fixed support structure includes said central shaft for supporting said kneading trough for rotation, said central shaft also supporting said kneading tool for rotation about said substantially horizontal axis, and wherein a mechanical drive for rotating said kneading tool is housed within said central shaft.

3. A kneading machine as defined in claim 1, wherein said kneading tool comprises two free end portions disposed in staggered planes defining a helical spiral with a horizontal axis perpendicular to the axis of rotation of said kneading tool.

4. The kneading machine as defined in claim 1, wherein said fixed support structure includes a base, said base housing respective reduction units for driving said kneading trough and said kneading tool, and wherein said kneading tool is carried by a spindle rotatably supported by said central shaft, said spindle being connected to its respective reduction unit.

5. The kneading machine as defined in claim 1, including a carriage which supports said kneading trough and is releasably coupled to the fixed support structure, wherein said support structure includes a cantilever arm projecting over said trough, a hollow shaft projecting below said arm and disposed centrally within said kneading trough, said shaft supporting said kneading tool for rotation about said horizontal axis, and means for raising of said hollow central shaft to carry said kneading tool out of said kneading trough.

6. A kneading machine comprising
    a fixed support structure including a central shaft
    a kneading trough centrally supported by said support structure for rotation about the vertical axis of said central shaft
    a kneading tool substantially completely disposed within said kneading trough for rotation about a horizontal axis
    means disposed within said support structure for rotating the kneading trough in the horizontal plane and the kneading tool in the vertical plane, and
    fixed counter-members comprising arm members supported by said central shaft and extending in a substantially horizontal plane on both sides of said kneading tool, said fixed counter-members cooperating with said kneading tool to separate dough entrained by said tool during rotation.

* * * * *